Aug. 6, 1968   E. W. FUERST ET AL   3,395,821
HOLLOW ARTICLE HAVING AN ATTRACTIVE, OPTICAL APPEARANCE
Original Filed May 13, 1965                    4 Sheets-Sheet 1
FIG. I
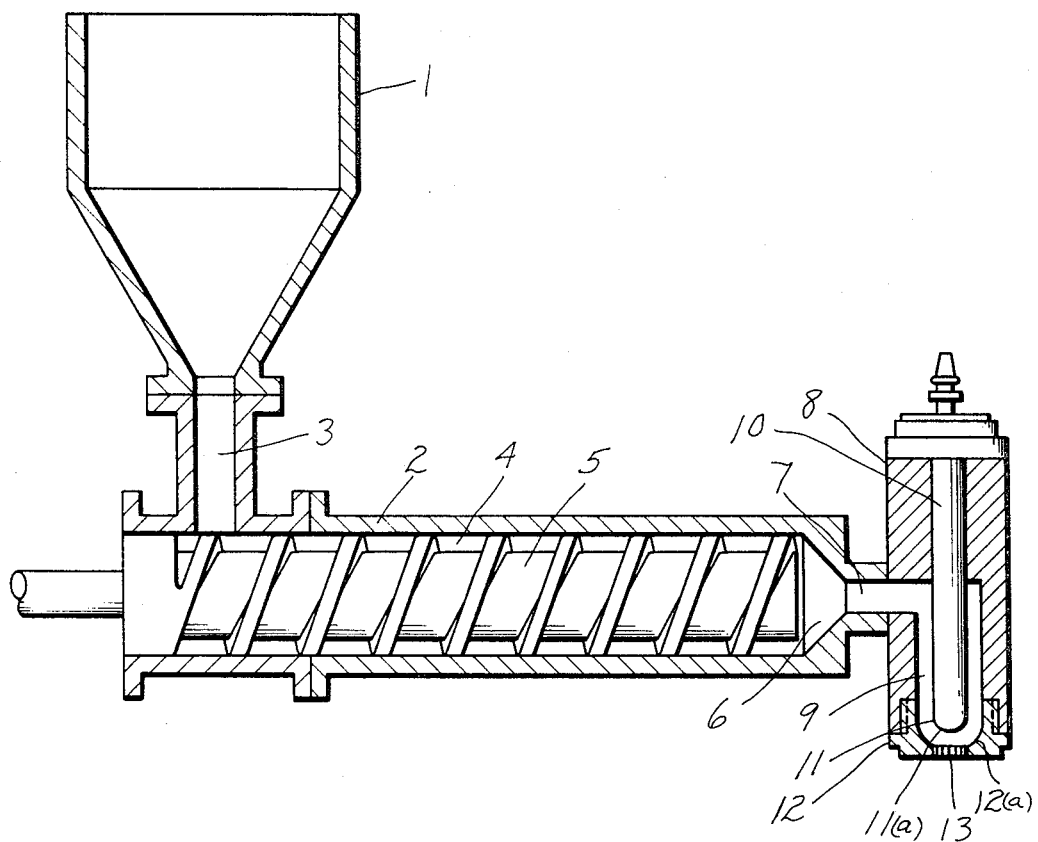
INVENTORS.
ROBERT B. MASON
EDWIN W. FUERST
BY
James C. Logomasini
ATTORNEY:

Aug. 6, 1968     E. W. FUERST ET AL     3,395,821
HOLLOW ARTICLE HAVING AN ATTRACTIVE, OPTICAL APPEARANCE
Original Filed May 13, 1965     4 Sheets-Sheet 2
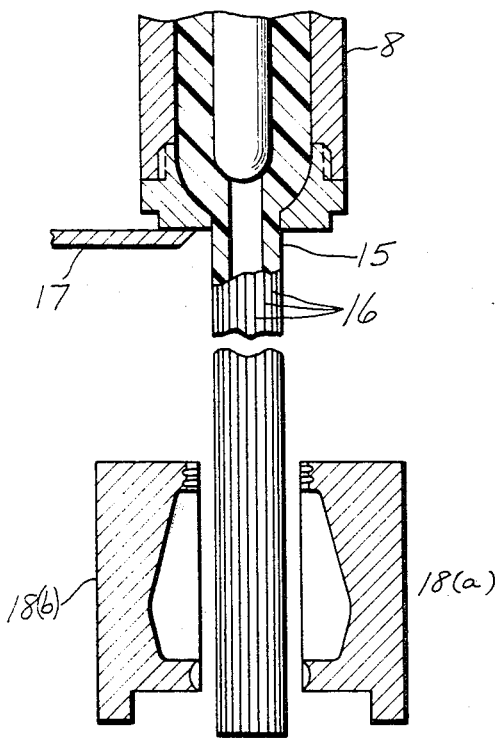
FIG. II
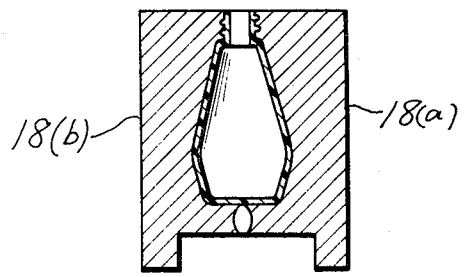
FIG. III
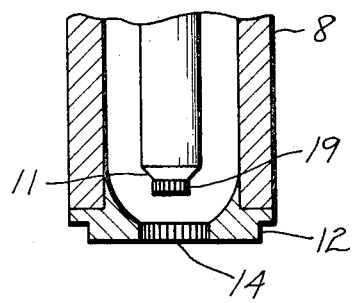
FIG. IV
INVENTORS.
ROBERT B. MASON
EDWIN W. FUERST
BY
James C. Bogomasini
ATTORNEY:

FIG. V(a)
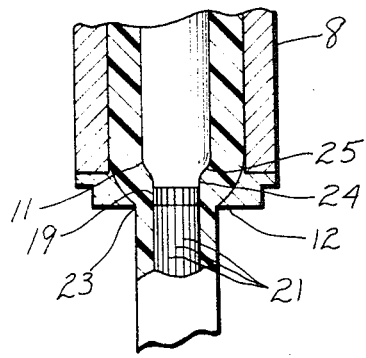
FIG. V(b)
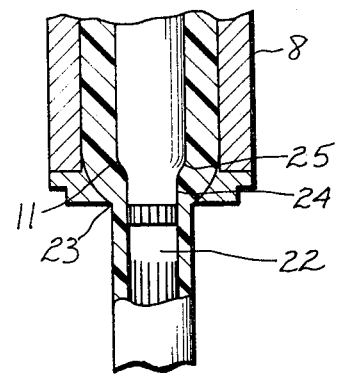
FIG. XIII
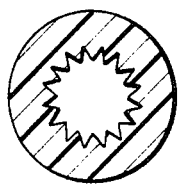
FIG. XIV
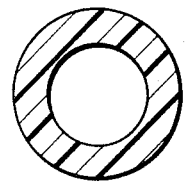
FIG. VI
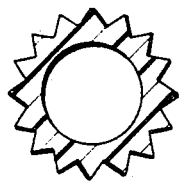
FIG. VII
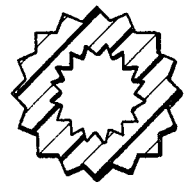
FIG. VIII
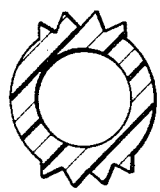

Aug. 6, 1968 E. W. FUERST ET AL 3,395,821
HOLLOW ARTICLE HAVING AN ATTRACTIVE, OPTICAL APPEARANCE
Original Filed May 13, 1965 4 Sheets-Sheet 4
FIG. IX
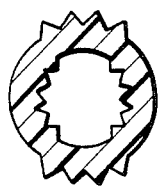
FIG. XI
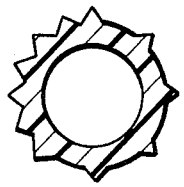
FIG. X
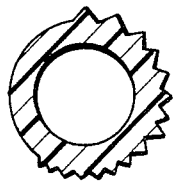
FIG. XII
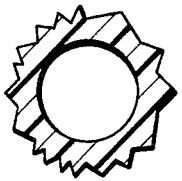
FIG. XV
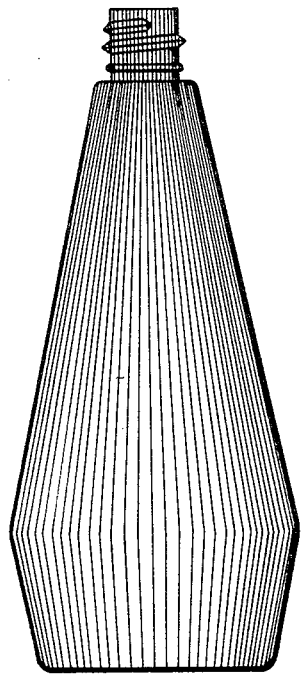
INVENTORS.
ROBERT B. MASON
EDWIN W. FUERST
BY
James C. Joyamasini
ATTORNEY:

United States Patent Office 3,395,821
Patented Aug. 6, 1968

3,395,821
HOLLOW ARTICLE HAVING AN ATTRACTIVE, OPTICAL APPEARANCE
Edwin W. Fuerst, Colrain, Mass., and Robert B. Mason, West Hartford, Conn., assignors to Monsanto Company, St. Louis, Mo., a corporation of Delaware
Application May 13, 1965, Ser. No. 455,452, which is a continuation-in-part of application Ser. No. 391,920, Aug. 25, 1964. Divided and this application Apr. 6, 1967, Ser. No. 628,905
18 Claims. (Cl. 215—1)

ABSTRACT OF THE DISCLOSURE

A hollow flexible plastic article having the appearance of a series of closely spaced rib-like grooves in its surface. Selectively oriented pearlescent platelets may optionally be incorporated into the plastic, which in combination with the rib-like grooves provide an enhanced optical appearance of alternating shades of color in the article.

---

This application is a division of copending application Ser. No. 455,452, filed May 13, 1965, which in turn is a continuation-in-part of copending application Ser. No. 391,920, filed Aug. 25, 1964, and now abandoned.

The present invention relates generally to a new and novel plastic container having enhanced beauty and improved strength, made according to the method and apparatus set out in the above mentioned copending applications.

Plastic container manufacturers are making increasingly greater inroads into fields normally occupied by the glass and paper industries as more economical and more efficient techniques become available in fabricating containers from plastc materials. Moreover, container manufacturers are constantly striving to produce a receptacle which will have an enhanced sales appeal. Generally, however, enhanced sales appeal is attained only at the sacrifice of some other desirable property or attribute, such as strength or economical fabricating techniques. It has now been discovered that a container having increased strength and enhanced aesthetic appeal can be manufactured without the necessity of resorting to more expensive techniques and with only nominal modifications of existing materials and equipment.

It is therefore an object of this invention to provide a container having an unusual rib-like optical effect built therein.

It is a further object of this invention to provide a container having strengthened walls by virtue of a series of circumferentially spaced ribs positioned axially along the walls of the receptacle.

It is a further object of this invention to provide a blow molded container of reduced weight that has a high degree of recovery in the walls of the container.

It is a further object of this invention to provide a receptacle having enhanced sales appeal resulting from a visual effect caused by wall thickness pattern in the receptacle in combination with the inclusion of special additives in the moldable plastic mixture.

These and other objects will become apparent from the following description when read in conjunction with the accompanying drawings which define preferred embodiments of the apparatus and in which:

FIGURE 1 is a sectional, elevational illustration of a preferred embodiment of an extrusion apparatus.

FIGURE 2 is a sectional, elevational and schematic illustration of the extrusion outlet portion of FIGURE 1 and accompanying blow mold.

FIGURE 3 is a sectional elevational schematic of a preferred embodiment of a blow mold in closed position.

FIGURE 4 is a sectional elevation of the extrusion outlet portion of a modified form of FIGURE 1.

FIGURES 5(a) and 5(b) are sectional elevations of the extrusion outlet portion of another modified form of FIGURE 1.

FIGURES 6 to 14 are cross sectional parison views illustrating varying forms and shapes of parisons made in accordance with this invention.

FIGURE 15 is an illustration of one form of container made in accordance with this invention.

The novel container of the present invention is one of enhanced beauty and strength, and is produced from a flexibly resilient plastic which may have incorporated therein a small amount of pearlescent or nacreous material. This plastic mixture is extruded into a tubular parison having a series of circumferentially spaced axially extending grooves, which is molded to produce the final container product.

The moldable mixtures used to produce the bottle of the present invention may be those disclosed in the Gutman et al. copending application Ser. No. 325,745 filed Nov. 22, 1963, and assigned to Monsanto Company. Therein it is set forth that a pearly luster finish may be produced on a plastic article by incorporating from about 0.2 percent to about 5 percent by weight of pearlescent crystal into the moldable plastic mixture.

Resinous materials of the moldable mixtures useable in accord with the present invention are selected from thermoplastics which are relatively soft and low melting. Exemplary of this group and preferred are polyethylene and polypropylene.

Organic and inorganic compounds may be used as the nacre producing material. Such compounds include, but are not limited to, basic lead carbonate, lead acid phosphate, lead acid arsenate, zinc phosphate, lead pyrophosphate, zinc ammonium phosphate, magnesium ammonium phosphate, mica, pearl essence (guanine composition derived from fish), soaps such as calcium stearate, metallic crystals such as aluminum flakes which may or may not be colored, etc. These nacre producing materials should desirably be in the form of small platelets ranging in face diameter from about 3 to 70 microns and in thickness from about 0.5 to about 5 microns.

Nacre producing crystals are generally added to the moldable thermoplastic mixture in the form of a paste which comprises the crystals and an inert non-volatile solvent that is clear and light transmitting. The solvent vehicle should be compatible with the resin in at least minor amounts and should have a boiling point of at least 200° C. When presented in the paste form, the nacre crystals are coated with the vehicle which prevents their agglomeration, minimizes fracture, and facilitates distribution of the crystals over the surface of the resin powder.

Suitable vehicles include but are not limited to $C_4$ to $C_{12}$ alkyl esters of acids such as phosphoric acid, phthalic acid and acids of the oxalic acid, series, exemplified by adipic acid and sebacic acid. Particularly good vehicles for purposes of the present invention are dioctyl phthalates, dibutyl phthalate and mixtures thereof. Highly refined white mineral oils may also be used.

The lustrous effect associated with the use of the pearlescent materials is brought about by simultaneous light reflection from a multitude of surfaces. These surfaces are supplied by the platelets of pearlescent crystals dispersed throughout the resin mixture at different levels. To achieve optimum results through use of the pearlescent materials, their index of refraction should differ from the surrounding resinous material by at least about 0.2. Hence, whereas polyethylene and polypropylene have refractive indices in the range of from about 1.50 to 1.60, the pearlescent crystals should have refractive indices of at least 1.70 and preferably 1.80 to 3.00.

Mixtures useful to produce the novel containers of the present invention comprise a resin powder and a paste of pearlescent material carried in an inert nonvolatile solvent. Sufficient amounts of the paste are added to produce a final resin mixture containing from about 0.2 to about 5 percent by weight of pearlescent crystals. During mixing, care must be taken to avoid mastication and production of back pressure on the mixture. The mixture may be very successfully compounded without excessive degradation of the crystals by a single pass through a ribbon blender.

The final moldable mixture is then processed through the hereinafter described apparatus to produce novel containers of this invention.

The extrusion apparatus illustrated in FIGURE 1 includes a conventional hopper 1 for supplying bulk plastic material having the nacre producing material incorporated therein, to a schematically illustrated conventional plasticizer and feeding unit 2. Plasticizing unit 2 includes a material inlet 3, an elongate passage 4, a plastic material advancing and pressuring worm screw 5, and an outlet 6. Unit 2 would be surrounded with conventional heating units, not illustrated, to effect the plasticizing of material being advanced through passage 4 by screw 5.

Outlet 6 terminates in an adjacent outlet 7 which communicates with the interior of the parison-forming unit 8. Parison-forming unit 8 includes a generally vertically extending bore 9 communicating with outlet 7. Mandrel 10 is mounted within bore 9 so as to define an annular cavity. At the lower end of the illustrated mandrel 10, there is mounted an extrusion tip 11 which provides an inner surface of an extrusion outlet for shaping the parison. An extrusion ring 12 is spaced from the tip 11 defining the outer surface of this extrusion outlet.

Tip member 11 has a downwardly facing generally convex surface 11(a). Ring member 12 includes an upwardly facing generally concave surface 12(a). An opening 13 extends from concave portion 12(a) in axial alignment with the tip. Plastic material containing the nacre producing crystals, when extruded through the apparatus and passed through the extrusion outlet defined by the tip 11 and the ring 12, issues from the opening 13 in the form of a hollow parison in the conventional manner recognized in the art. Extrusion ring 12 is characterized in this particular embodiment by a series of circumferentially spaced axially extending protrusions 14. These protrusions impart circumferentially spaced axially extending grooves 16 to the parison along its outer periphery, as illustrated in FIGURE 2, and consequently axially orients the pearlescent material within the parison walls.

Reviewing the apparatus in overall perspective, it will be appreciated that at the left end of illustrated screw 5 there is provided a source of plastic material having incorporated therein a nacre producing substance. At the opposite ends of the apparatus, an extrusion outlet is defined by cooperating ring 12 and tip 11. Plasticizer passage 4, connecting passage 7 and the annular passage encircling mandrel 10, affords a continuously open feed cavity for maintaining communication between the plastic material being fed and the extrusion outlet 13.

The extruded, grooved parison, a cross-section of which is illustrated in FIGURE 6, is then introduced into a suitable mold for transformation into a useful article. In the particularly preferred embodiment illustrated in FIGURE 2, the parison is transferred between open mold members to the position illustrated. Thereafter, the mold members 18(a) and 18(b) are closed, and a cut-off or shearing blade 17 adapted to move transversely across the outer end of the cavity severs the parison between the mold and extrusion outlet. The mold is closed about the parison while pinching in the lower joint thereof, the exteriorly projecting portion of the parison. The pinched parison is thereafter blown by fluid pressure into surface contact with the mold cavity walls as illustrated in FIGURE 3. This type of operation is well known in the art and is subject to many variations in the type of blowing technique employed, as well as in the particular series of sequential operations performed to mold the parison into a finished article. Reference may be made to U.S. 2,669,752, U.S. 2,349,177, U.S. 2,975,473, and U.S. 2,597,558 in this regard.

One example of a finished receptacle is illustrated in FIGURE 15, and consists of a top wall having an upstanding tubular neck, a bottom wall and a side wall; the walls being characterized by a series of rib-like circumferentially spaced grooves or striae extending from the neck to the bottom wall. The exterior walls of the container will feel essentially smooth to the touch in areas where the parison undergoes substantial stretching during the blowing operation, although the ribs are still clearly visible. This effect is caused by the pressure of the air or other fluid medium used to blow the parison against the mold cavity. Thus even though the grooves may be present only on the outside of a parison formed in the manner illustrated in FIGURE 2, the ribs will appear to be on the inside of the finished container, except in those areas in which there is minimum blow up of the parison, where they appear as striae in the outer surface such as in the neck area. The alternating ribs, due to different angles of light reflection, produce a visual effect of alternating shades of the basic color, although obviously the parison used to produce this effect is but one color throughout. As a result of this unusual optical effect, the finished receptacle emanates a quality of luxury not generally associated with synthetic plastic containers, and one which is achieved at a virtually negligible cost increase over plastic containers presently available.

By including a pearlescent material in the moldable plastic mix, however, a still more improved container is produced. Not only does the container have an aesthetic advantage due to the differing angles of light reflecting from alternating ribs, but also is quite synergistically improved due to the added presence of the oriented pearlescent material which affords the lustrous effect produced by simultaneous light reflection from the crystal platelets dispersed throughout the plastic at varying depths. Inclusion of the pearlescent material in a transparent or translucent producing plastic mixture produces an exceedingly improved container. Delineation of the rib-like effect is much more pronounced, thereby tremendously adding to the aesthetic value and sales appeal. Amazingly pure and soft colors are obtainable in blow molded bottles of the present invention.

Moreover, any of the conventional pigments, lubricants, stabilizers, fillers, and the like may be included in the plastic mixture to produce the desired container.

FIGURE 4 illustrates a modification of the embodiment illustrated in FIGURE 1 wherein both the ring member 12 and the tip member 11 have circumferentially spaced axially extending projections. As becomes readily apparent, projections 19 spaced along tip 11 will impart a series of spaced grooves to the inner periphery of the parison, as illustrated in cross section in FIGURE 7. This parison, when molded by such a technique as shown in FIGURES 2 and 3, will form a receptacle having a riblike or striated configuration extending along the length of the container from the neck portion, along the side walls and to the bottom portion of the container. These ribs enable the receptacle to be blown at a reduced weight and still maintain a substantial degree of recovery in the walls of the container.

FIGURES 5(a) and 5(b) illustrate still another modification in the techniques heretofore illustrated. In FIGURE 5(a), ring member 12 contains no means for imparting axially extending grooves but consists of a conventional opening which imparts a smooth finish to the outer wall of the parison 20. Tip 11, on the other hand, imparts a series of circumferentially spaced axially extended grooves 21 to the inner walls of the parison 20. In FIGURE 5(b), it can be seen that by advancing the mandrel 25 in an axially downward direction relative to the orifice of the ring member, tip member 11 will no longer impart grooves to the inner wall of the parison, as illustrated at 22. Thus, through the use of a ring and tip arrangement such as that illustrated in FIGURES 5(a) and 5(b), a parison may be extruded having axially spaced portions at selected intervals along the inner wall of the parison.

When the tip 11 is positioned so that outermost tip portion 19, which has a series of radially extending projections, cooperates with the circular orifice defining ring portion 23, a parison cross sectional configuration as shown in FIGURE 13 is produced. After extruding a section of the parison having a cross section as shown in FIGURE 13, the tip 11 may then be lowered so as to cause the intermediate portion 24 which has a smooth surface to cooperate with the orifice defining ring portion 23. With this tip positioning, there would be extruded a parison portion having a cross sectional configuration as shown generally in FIGURE 14. Should it be desired to extrude a parison having an enlarged inside diameter, the tip member 11 may be further lowered to cause the inner tip portion 25 to cooperate with the orifice defining ring portion 23. The enlarged size of this portion of the tip in relation to the intermediate tip portion 24 would cause an increase in the parison inside diameter. This manner of varying the inside diameter of a parison, as well as a means for imparting reciprocal axial motion to the mandrel is more fully described in U.S. 3,217,630, and the various means described therein for imparting reciprocal axial motion to a mandrel are incorporated herein by reference. Obviously, this invention is not limited to any particular method of varying the geometry of the extrusion outlet to impart an alternate sequence of grooves and smooth areas to the internal walls of the parison.

The above described manner of selectively varying the inner wall geometry of a parison to provide alternate grooves and smooth sections opens up numerous possibilities in designing a receptacle or other hollow body. For example, the container may be formed having ribs extending only on a selected portion of a container or a hollow body may be produced having a sequence of alternate grooves and smooth sections. Numerous other variations will readily occur to one skilled in the art.

FIGURES 8–12 illustrate additional modifications which will impart other optical effects to the physical container as well as providing structural strength at any desired point along the receptacle. Obviously the ring and tip members will be varied with respect to the depth of groove and the shape and position of the projections along the periphery of their respective members to correspond to the desired shape in the parison as it emerges from the extrusion outlet.

FIGURES 8 and 9 illustrate embodiments wherein the groved portions extend only partly around the parison. FIGURE 10 illustrates an embodiment wherein the grooves are of unequal depth around the periphery of the parison, while FIGURE 11 illustrates a parison in which the grooves are unequally spaced around the periphery of the parison. FIGURE 12 illustrates a parison in which the distance between the grooves from trough to trough varies around the perimeter of the parison. Many other modifications will readily occur to one skilled in the art.

One of the principal attributes of this unusual technique resides in the previously mentioned observations that receptacles produced in accordance with this invention possess an unusual optical effect caused by the variation in wall thickness at different intervals in the final article. Depending upon the particular shape of the receptacle formed within the mold, the ribs tend to flatten out at areas in which the parison is stretched to accommodate the wider portions of the mold. Accordingly, since the light is reflected through different angles at different sections of the receptacle, a visual effect is created which tends to produce an illusion of color shading. This color shading effect which may be compounded with the lustrous effect produced by pearlescent platelets dispersed throughout the wall at different depths truly produces a greatly improved container.

The structurally simple mechanism for producing these receptacles is of considerable importance. Operations may be effected with only nominal modifications of existing extrusion equipment by simply replacing the conventional tip member and/or ring member with one having the desired axial protrusions. A particularly significant advantage attributable to this invention is that no modification need be made in the conventional blow molding equipment to produce these receptacles. Likewise normal moldable mixtures need only be slightly modified, i.e., addition of a pearlescent material. Accordingly, the expenses involved in providing new molds to produce bottles or receptacles having a new and unusual finish are obviated, and only nominal increases in total bottle cost are incurred.

The value of the additional strength in the walls of the container by the placement of vertical ribs positioned at set intervals is apparent, as is the advantage of producing a bottle at a reduced weight.

Obviously many variations in the method and apparatus disclosed will become apparent to one skilled in the art. For example, it is possible to vary the internal and external shape of the parison to produce, for example, an oval shaped parison rather than one of generally circular configuration. In addition, many other blow molding techniques may be employed in extruding a parison into the shape of a container, such as those illustrated in copending applications Ser. No. 327,789, now U.S. Patent No. 3,303,249, Ser. No. 323,398, now U.S. Patent No. 3,272,896, and Ser. No. 323,420, now abandoned, all of which are assigned to Monsanto Company.

While the materials and apparatus disclosed in the invention have been described with reference to preferred embodiments, additional modifications will readily occur to those skilled in the extruding arts. For example, a plasticizing structure other than the structure schematically illustrated may be employed. Additionally, depending upon the particular parison shape desired, the extrusion outlet may assume other shapes which will impart a grooved effect to the parison. For example, grooves may be imparted to the parison by pins or other projections extending from the ring or tip. It is also within the scope of this invention to produce axially or radially extending grooves in the parison after it has emerged from the extrusion outlet and prior to its introduction into the mold. Further, the pearlescent material may be selected from quite a number of compounds and it is envisioned that outside of those herein mentioned, certain ones may be more desirable for certain thermoplastic compositions than others. Also numerous ways are envisioned for introducing the pearlescent material into the moldable mixtures as well as variations in the final mixture itself.

In addition, relative changes in the position of the tip and ring may be accomplished by movement of the ring rather than the tip, if desired. It is also possible to produce alternate grooved and smooth sections on the outer wall of the parison as well as the inner wall of the parison.

What is claimed is:

1. A container formed of resilient plastic material, comprising an upper shoulder having an opening defined by an upstanding tubular neck, a bottom wall spaced from the shoulder, and an integral side wall extending between the periphery of the shoulder and the bottom wall, said container having an essentially smooth exterior surface, said container being characterized as having the optical appearance of a series of axially extending, sharply discernable narrow bands of alternate shades of color, produced by varying amounts of light reflecting from wall sections having closely spaced, minute peripheral variations in thickness, which extend axially along the side wall.

2. The article of claim 1 wherein the container is an oval bottle.

3. The container of claim 1 wherein the bands extend along the length of the container from the shoulder to the bottom wall.

4. A bottle formed of a resilient plastic material, comprising a top wall having an opening defined by an upstanding tubular neck, a bottom wall below the top wall, and an integral side wall joining the periphery of the top wall with the periphery of the bottom wall, said bottle being characterized by a series of closely spaced, sharply discernable axially extending, narrow bands of alternate shades of color, substantially equally spaced from each other around a peripheral portion of the side wall, and resulting from varying amounts of light reflecting from the surfaces of substantially parallel, axially extending striations in the sidewall, said bottle having an essentially smooth exterior surface.

5. The bottle of claim 4 wherein the striations are in the exterior surface of the side wall.

6. The bottle of claim 4 wherein the striations are of varying width.

7. A hollow article formed of a resilient plastic material having incorporated therein a small amount of pearlescent material, the article being characterized as having the optical appearance of sharply discernable, narrow bands of alternate shades of color produced by varying amounts of light reflecting from wall sections having closely spaced, minute variations in thickness.

8. The structure of claim 7 wherein the article is a bottle.

9. A bottle formed of a flexible thermoplastic comprising a bottom wall, a sidewall contiguous at one end with the bottom wall and having a striated surface, and a top wall contiguous with the other end, having an upstanding tubular neck, said striated surface having pearlescent platelets oriented therein.

10. The bottle of claim 9 wherein orientation is selective, the faces of portion of the platelets being oriented substantially parallel to the surface of the sidewall, with another portion of said platelets oriented in a different direction.

11. The bottle of claim 9 wherein the striae are minute furrows in the exterior surface of the sidewall.

12. The bottle of claim 9 wherein the thermoplastic is a polyolefin.

13. The bottle of claim 9 wherein the pearlescent is present within the range of about 0.2 to 5% of the total weight of pearlescent and thermoplastic.

14. The bottle of claim 12 wherein the polyolefin is selected from the group consisting of polyethylene and polypropylene.

15. The bottle of claim 13 wherein the pearlescent material is basic lead carbonate crystals.

16. The bottle of claim 13 wherein the pearlescent material is pearl essence.

17. The bottle of claim 13 wherein the pearlescent material is mica.

18. The bottle of claim 15 wherein the striated surface extends from the upstanding tubular neck to the bottom wall.

References Cited
UNITED STATES PATENTS

| | | | |
|---|---|---|---|
| D. 206,830 | 1/1967 | Marchant | 58—6 |
| 2,352,205 | 6/1944 | Karlson | 215—1 |
| 2,899,110 | 8/1959 | Parker | 215—1 |

DONALD F. NORTON, *Primary Examiner.*